MAGNETIC TAPE APPARATUS AND TAPE DRIVING MEANS THEREFOR

Filed Oct. 5, 1951

6 Sheets-Sheet 1

WALTER T. SELSTED
INVENTOR.

BY Lippincott & Smith

ATTORNEYS

WALTER T. SELSTED
INVENTOR.
BY Lippincott & Smith
ATTORNEYS

MAGNETIC TAPE APPARATUS AND TAPE DRIVING MEANS THEREFOR

Filed Oct. 5, 1951 6 Sheets-Sheet 3

WALTER T. SELSTED
INVENTOR.

BY Lippincott + Smith
ATTORNEYS

MAGNETIC TAPE APPARATUS AND TAPE DRIVING MEANS THEREFOR

Filed Oct. 5, 1951 6 Sheets-Sheet 4

WALTER T. SELSTED
INVENTOR.

BY Lippincott & Smith
ATTORNEYS

May 22, 1956 W. T. SELSTED 2,747,025

MAGNETIC TAPE APPARATUS AND TAPE DRIVING MEANS THEREFOR

Filed Oct. 5, 1951 6 Sheets-Sheet 5

WALTER T. SELSTED
INVENTOR.

BY Lippincott & Smith
ATTORNEYS

May 22, 1956 W. T. SELSTED 2,747,025

MAGNETIC TAPE APPARATUS AND TAPE DRIVING MEANS THEREFOR

Filed Oct. 5, 1951 6 Sheets-Sheet 6

WALTER T. SELSTED
INVENTOR

BY Lippincott & Smith

ATTORNEYS

United States Patent Office 2,747,025

Patented May 22, 1956

2,747,025

MAGNETIC TAPE APPARATUS AND TAPE DRIVING MEANS THEREFOR

Walter T. Selsted, San Mateo, Calif., assignor to Ampex Corporation, a corporation of California Application October 5, 1951, Serial No. 249,950

6 Claims. (Cl. 179—100.2)

This invention relates generally to recording and/or reproducing machines or apparatus of the type making use of a pliable magnetic record strip or tape.

In machines of the above character various arrangements have been used for driving the magnetic tape. One common arrangement is to employ a driving capstan with an associated pressure roller to insure sufficient frictional contact between the tape and the capstan. Tensioning arms and stabilizers are normally utilized in such apparatus, since uniform tape motion is imperative where it is desired to minimize the appearance of "wow" and "flutter." "Wow" is regarded as being any variation in speed of the drive below the arbitrary value of 5 cycles per second and "flutter" is regarded as variations above 5 cycles per second. Where there were irregularities in tape thickness, as inevitably results from time to time, compensation by members of the aforementioned types, as well as other devices, became necessary. The type of magnetic tape usually employed with these devices is formed of plastic or paper, or it may be a cellulose or cellulose-acetate, but in either event one side thereof is coated with a ferrous substance, such as iron oxide.

In general it is an object of the present invention to provide a new machine of the above character which is capable of precision recording and/or play-back operations.

Another object of the invention is to provide apparatus of the above character which more effectively presents the magnetic tape to the recording and/or reproducing heads, and which has novel means for driving the tape.

Another object of the invention is to provide a novel capstan assembly which makes use of pneumatic suction for establishing driving contact with the magnetic tape.

Another object of the invention is to provide apparatus of the above character which is applicable to multi-channel recording and playback operations.

Another object of the invention is to provide a novel assembly including magnetic recording and reproducing heads, and a tape driving capstan which serves both to drive the tape and to present portions of the tape to the magnetic heads.

Additional objects and features of the invention will appear from the following description in which the preferred embodiments of the invention have been disclosed in detail in conjunction with the accompanying drawing:

Referring to the drawing.

Figure 1:
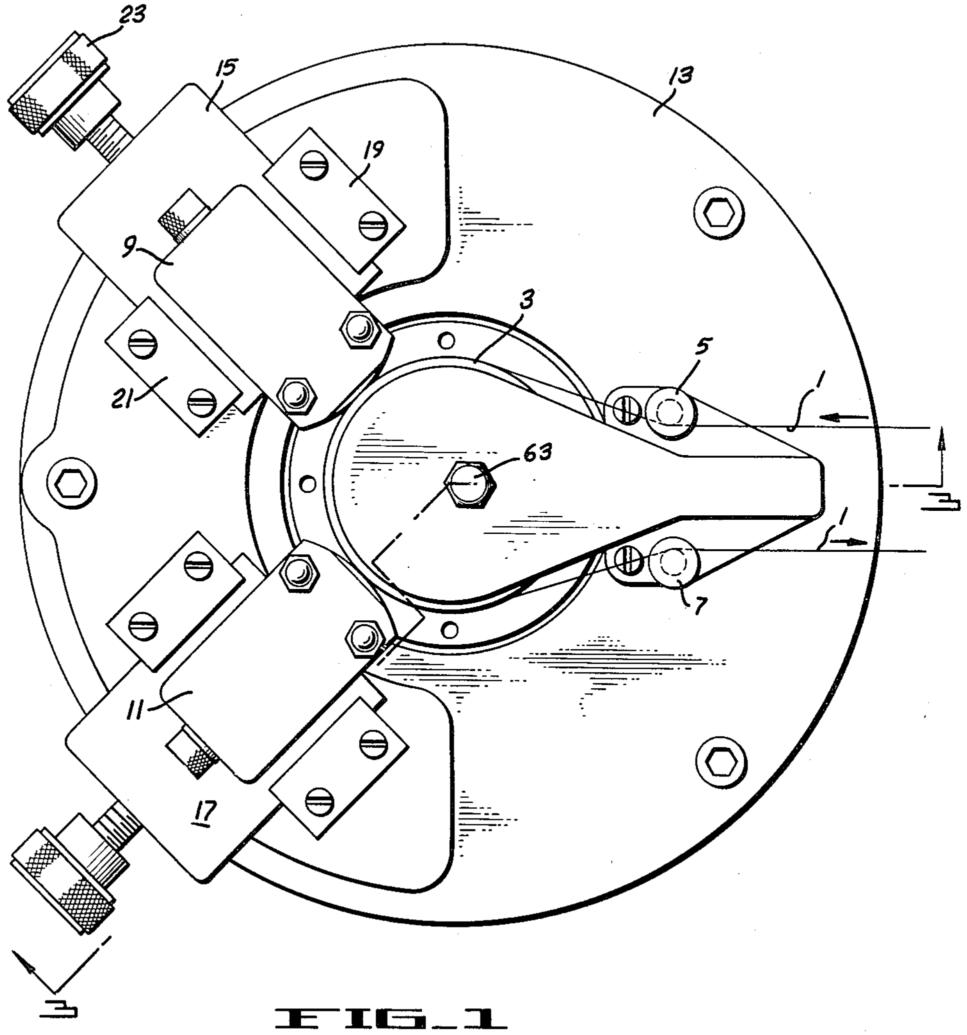
Fig. 1 is a plan view showing the driving assembly of the present invention and associated recording and reproducing heads.

Referring to the drawings, and more particularly to Fig. 1, a magnetic tape 1 upon which recordings are to be made and from which reproductions of recorded messages are translated is positioned to be driven by a drum 3. In use the tape is threaded about a bearing or guide 5 and around a portion of the periphery of drum 3, after which it is guided off the drum by a bearing or tape guide 7. With the direction of tape motion as in Fig. 1, a magnetic recording head 9 is supported about the periphery of the drum 3 to contact the tape 1. A reproducing head 11 is also supported to contact the tape at a circumferentially spaced point. A base mounting platform in the form of a circular plate 13 forms a support for the bearings 5 and 7 and carriages 15 and 17 upon which the magnetic heads 9 and 11 are adjustably supported. Spring tabs 19 and 21 are secured to the plate 13 to bias against the carriage 15 and thus maintain it in a relatively fixed position. A thumbscrew 23 is provided to move carriage 15 with respect to the plate 13. Thus, by adjusting thumbscrew 23, the pressure applied by head 9 to force tape 1 into the peripheral grooves of drum 3 may be controlled. Similiar structure is also provided for reproducing head 11.

It should be mentioned that an erasing head (not shown) may also be mounted on the circular plate 13, thus to form a compact assembly. However, less shielding is required if the erasing head is placed elsewhere along the tape path.

The angle of contact between each magnetic head and the tape 1 is usually of the order of 4 to 8 degrees. By adjusting thumbscrew 23, for example, and thus causing head 9 to force the tape 1 into the groove or grooves 25 (Fig. 2), depending upon whether magnetic head 9 is a single or multi recording head, the cushion effect previously mentioned is obtained.

The bearing surfaces 5 and 7 are preferably of a very hard material, such as sapphire, glass or hard steel. Such material is necessary, because the iron oxide coating on the tape slides over these bearing surfaces.

Figure 2:
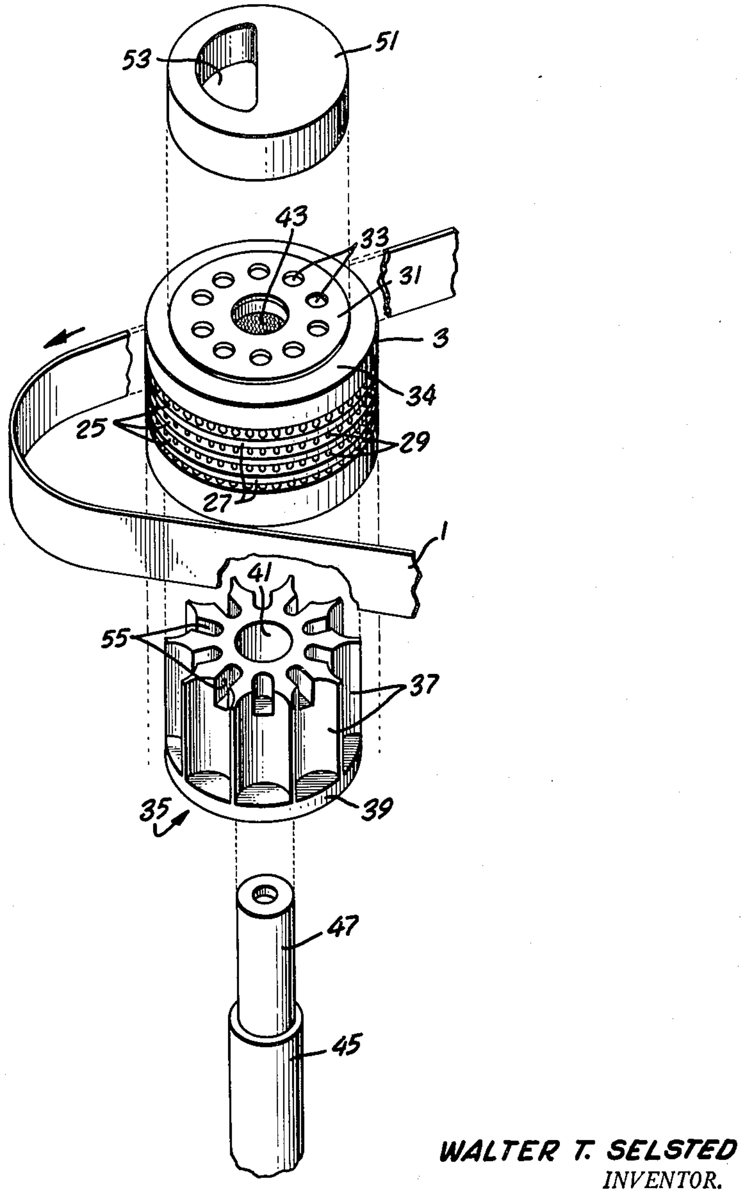
Fig. 2 is an exploded view in perspective of the driving assembly per se.

In Fig. 2 the drum 3 includes a plurality of circumferential grooves 25 located to define a lesser number of ridges 27. The ridges 27 and the portions of the drum periphery adjacent the grooved portion form an abutting surface for contact with the tape 1. The peripheral portions of the drum 3, defined by the grooves 25, each contain a plurality of openings 29 which communicate with the interior of the drum. A bearing plate 31, preferably of a smoothly finished hard material, has a plurality of openings 33, alined with a corresponding number of openings in the closed end 34 of drum 3 also to communicate with the interior of the drum. If the drum 3 is constructed of hard material, the bearing plate 31 may be eliminated; however, drum 3 may be formed of brass or other non-magnetic material so as not to influence the recording and reproducing functions of the heads. The harder metal is thus desirable for the bearing or contacting surface.

A vacuum distributor generally designated at 35 is cylindrically shaped and contains a plurality of longitudinal grooves 37. A circular plate 39 forms one end of the distributor. It may be secured tightly thereto or cast integrally therewith. This plate is of such shape as to close the lower end of drum 3 to form an air tight seal between the plate and the drum when the distributor is placed within the drum. An axial bore 41 in the distributor 35 is alined with the opening 43 in the top end of drum 3 and bearing plate 31. A shaft 45, having at one end thereof a portion of reduced diameter 47, is adapted to serve as a support and drive shaft for the distributor and drum when the portion 47 is fitted through the bore 41 and the opening 43.

In order that the tape 1 will adhere to a portion of the periphery of drum 3, and so that air leakage will not occur through the openings 29 in the remainder of the periphery of the drum, a disk 51, including an off-center exhaust port 53 located to establish fluid communication with only the openings 29 which are covered by tape 1, is provided to contact bearing plate 31 and to remain fixed relative to the rotating drum 3.

With the foregoing arrangement and when suction is applied through the port 53, the tape 1 adheres to the grooved portion of drum 3 along the tape contacting portion of the drum periphery, because suctions paths or conduits are provided from the openings 29 in the tape contacting drum peripheral portion, along the grooves or conduits 37 in the distributor, through the openings 33 in the top portion 34 of the drum 3 and the bearing plate 31, and out the exhaust port 53. In order that the openings 33 may better cooperate with the grooves 37, conforming recesses 55 are provided at the top portion of the grooves 37.

Figure 3:
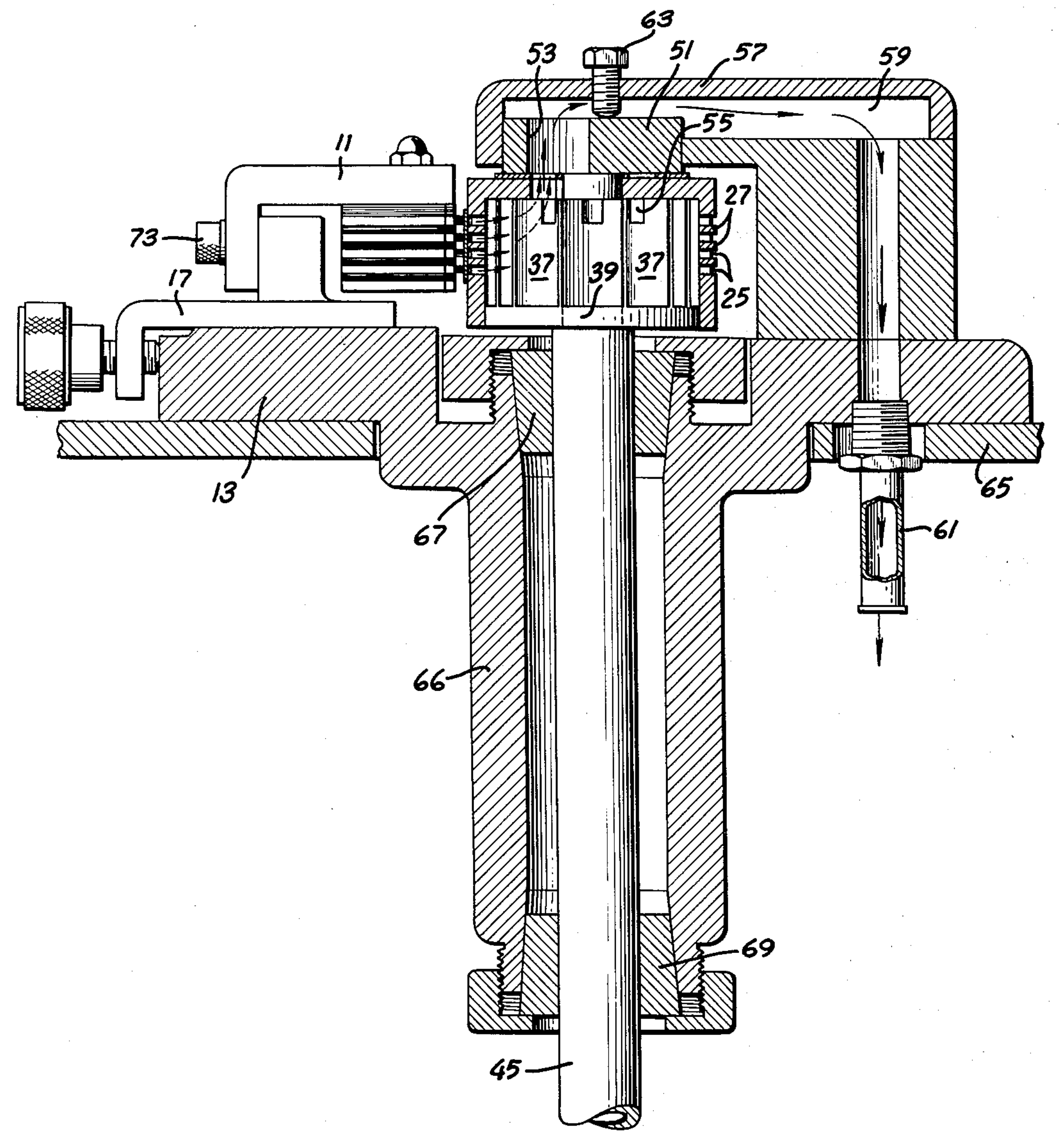
Fig. 3 is a cross-sectional view of Fig. 1 taken along the plane 3—3.

In Fig. 3 a cross-sectional view of the elements embodied in the present invention, taken along the plane 3—3 of Fig. 1, is shown. In this figure, a cap member 57 including an exhaust passage 59 which communicates with the exhaust port 53 at one end and with a pump outlet 61 at the other end is mounted to bias disk 51 against the bearing plate 31 by means of adjustable thumbscrew 63. A base or platform 65 serves to support the circular plate 13 and integral stem 66 and the elements mounted on plate 13. Adjustable sleeve bearings 67 and 69 are provided at both ends of the stem 66 for centering and guiding the shaft 45. These bearings are made adjustable so that any play in shaft 45 may be taken up. Reproducing head 11 is shown attached to carriage 17 by screw 73. This provides a rigid support, yet readily admits of removal and replacement of the multi-head unit 11.

Figure 4:
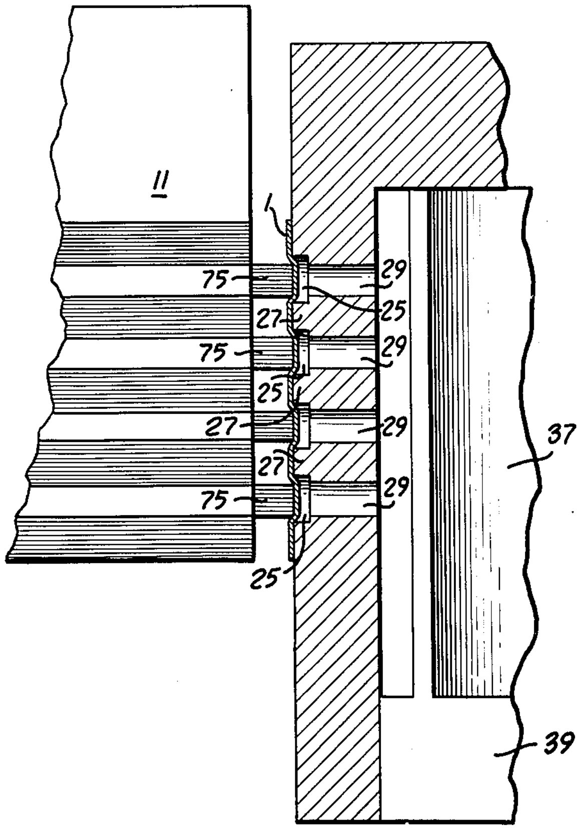
Fig. 4 is a magnified detail schematic view of a portion of Fig. 3.

A detailed view in cross section of the tape-drum contacting area and adjacent members is shown in Fig. 4 in considerably enlarged form for clarity of illustration. The multi-head reproducer 11 is shown as having four individual heads 75, each biasing tape 1 into respectively associated drum grooves 25. The tape 1 is also supported on the outer edges thereof by drum 3 and between the grooves 25 by ridges 27. As was previously mentioned, the grooves 25 permit a cushion effect between heads 75 and the tape 1, which effect compensates for any irregularities in the tape thickness, i. e., thicker portions of the tape are merely biased farther into the grooves 25 to maintain good contact between the tape 1 and the heads 75 at all times. The openings 29 which communicate with the drum interior provide air passages from tape 1 to the vacuum pump (not shown), in order that suction may be applied to tape 1 to cause adherence of the tape to the drum 3.

Figures 3A, 3B, 3C, 3D, 3E:
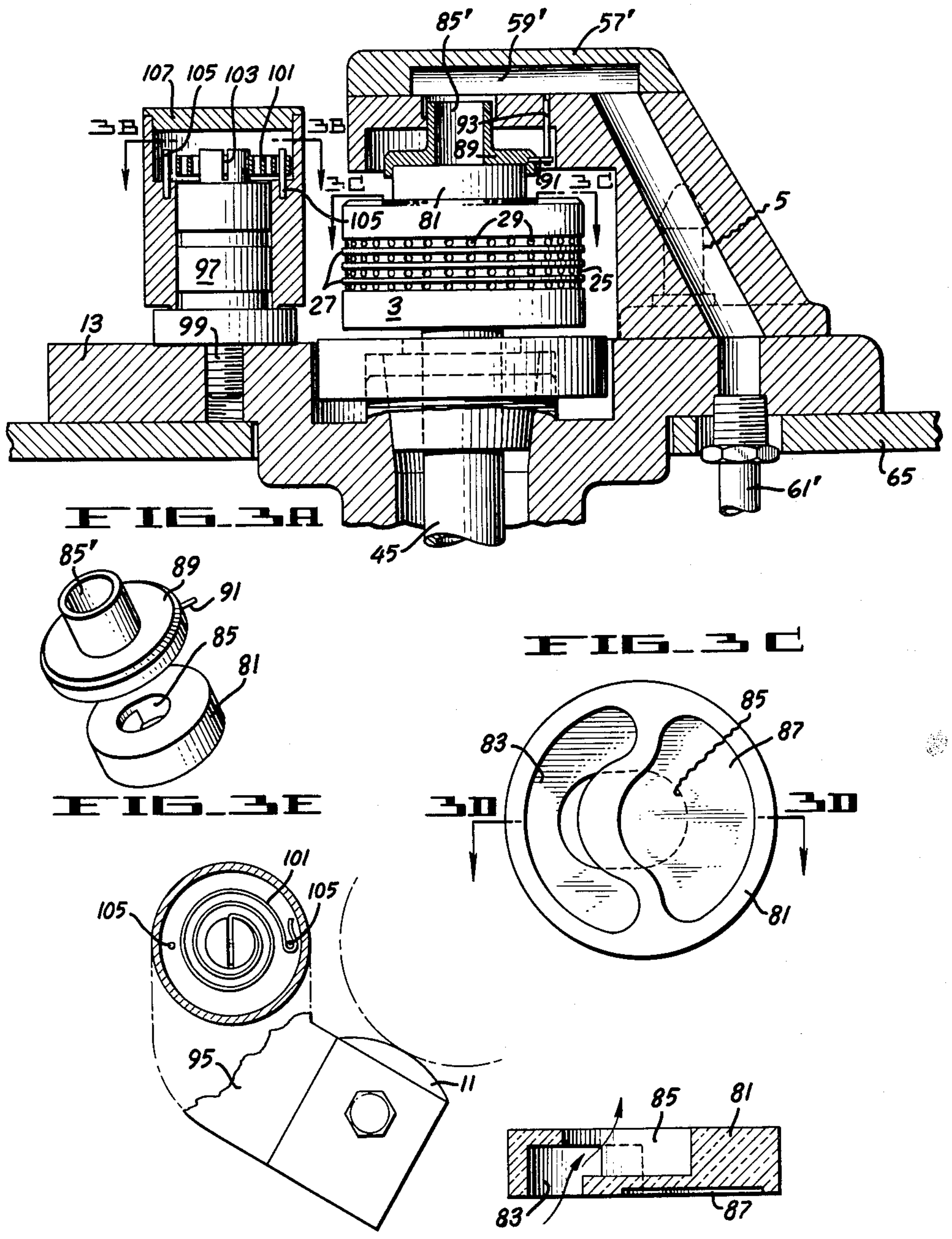
Fig. 3A is a view partly in cross section and partly in side elevation similar to Fig. 3, but employing modified forms of the invention.
Fig. 3B is a view in plan of the resilient means utilized to apply tension to the magnetic head and arm, taken along the plane 3B—3B.
Fig. 3C is a bottom view of the manifold insert taken along the plane 3C—3C.
Fig. 3D is a cross-sectional view of the insert of Fig. 3C taken along the plane 3D—3D.
Fig. 3E shows an exploded view in perspective of the manifold structure.

The modifications included in the present invention appear in the structure of Figs. 3A through 3E, with the structure of Fig. 4 being applicable to both of the arrangements of Figs. 3 and 3A. In Fig. 3A the drum 3 is supported for revolution on the shaft 45 which penetrates the circular plate 13. In place of the disk 51, however, an insert 81 is adapted to ride on the upper surface of the drum. This insert, as is shown in Figs. 3C and 3D, has an off-center opening 83 in the underneath side thereof which communicates with a passage 85 therethrough. This off-center opening is in the form of an arcuate slot such that a fluid conduit is formed from the drum openings 29 which are covered by the tape 1 through the insert 81 via the opening 83 and the passage 85. As is shown in Fig. 3D, a portion of the passage 85 extends radially of the insert 81. Also, a recess 87 is provided in the underneath side of the insert 81 such that a fluid path is established to this recess from the drum medium through the drum openings 29 (not covered by the tape 1) and along some of the distributor grooves 37.

A coupling 89 having a passage 85' (Figs. 3A and 3E) is provided to extend the fluid passage from the drum 3, and a cap 57' having a passage 59' completes the fluid path to the vacuum pump coupling 61'. Preferably the insert 81 is comprised of a self-lubricating material such as graphited nylon, and the coupling 89 is of plastic, steel or other suitable material. These members are cemented or otherwise secured together with the insert fitted into a recess in the coupling such than an air-tight seal is achieved. A pin 91 extends from the periphery of the coupling 89 to abut against a depending stub 93 fastened in the cap 57'. Thus the coupling and insert are fixed against rotation.

In operation the coupling and insert comprise a manifold which forms a part of the vacuum distribution system. With the tape 1 in position as is shown in Fig. 4, the partial vacuum created in drum 3 maintains contact between the tape and drum. The manifold insures that reduced pressure is applied only to a portion of the drum including the distributor grooves 37 which communicate with those drum peripheral openings 29 covered by the tape. At the same instant, however, others of the drum openings 29 (not covered by the tape) permit atmospheric pressure to be applied along cooperating distributor grooves 37 to the insert recess 87. Hence a pressure differential is applied to the manifold which results in a force that tends to move the manifold in an upward direction. The air which is being evacuated from the drum follows the radial passage through the insert, thereby providing the lifting action. Further, the presence of atmospheric pressure in the insert recess 87 insures that foreign particles will not collect between the insert and drum because air rushes from the recess to the reduced pressure area (opening 83) when such particles separate the insert and drum. The weight of the manifold, however, is such as to normally maintain an air-tight sealing between the drum and insert.

Figs. 3A and 3B provide a showing of alternate structure suitable for supporting the magnetic heads. In Fig. 3B the head 11 is carried by an arm 95 which is pivotally supported on a post 97. This post is fixedly secured to the circular plate 13 by suitable means, such as the threaded bolt 99. Resilient means, shown as spring 101, is secured to post 97 by insertion in a slot 103 and to arm 95 by being clamped about one of the stubs 105. A fluid such as number 700 S. A. E. oil is contained between the post and arm contacting surfaces to damp out any oscillations of arm 95 owing to the resiliency of spring 101. By providing two or more stubs 105 the force exerted by spring 101 may be regulated relative to the oil retarding force. Of greater importance, however, is the fact that the pressure exerted by head 11 against the tape is readily varied. A cover 107 is provided in the arm 95 which can be removed to yield access to the spring 101.

Figure 5:
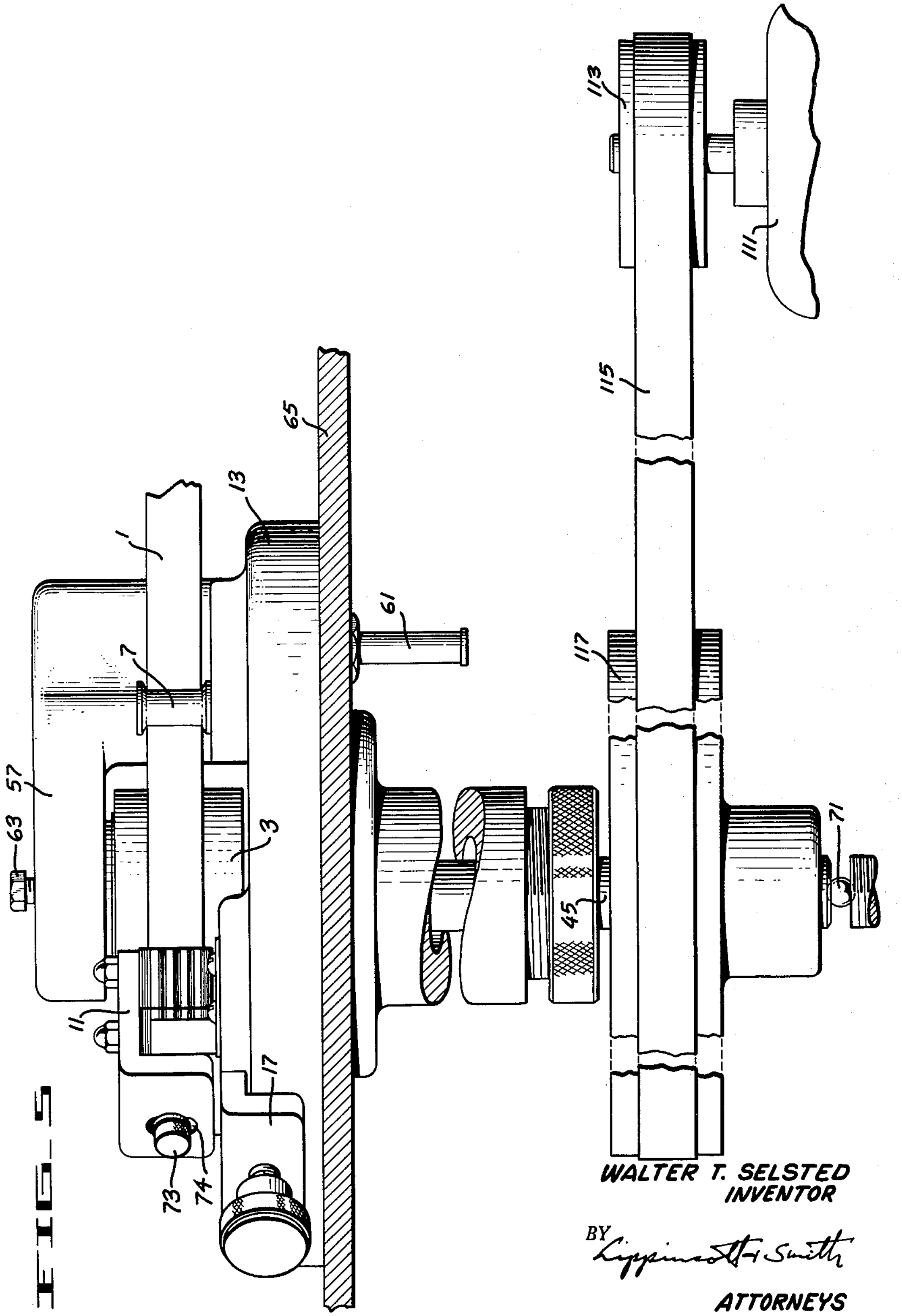
Fig. 5 is a view in side elevation of a driving assembly, and associated flywheel and drive motor, and a recording head.

A view in side elevation of an entire assembly embodied in the present invention is shown in Fig. 5. A drive motor 111 with associated pulley 113 drives belt 115, which causes flywheel 117 and shaft 45 to rotate. Flywheel 117 has a high momentum with respect to drum 3 and distributor 35, in order that drum 3 will be free from variations in speed of motor 111 by reason of the mechanical filtering action of the flywheel drive. The supporting platform 65 is made sufficiently extensive to shield the heads 9 and 11 from any electrostatic and electromagnetic disturbance which might be created by motor 111. Mounted upon support 65 is the cap member 57 which biases disc 51 against the bearing surface on the closed end 34 of drum 3 by means of thumbscrew 63. The vacuum exhaust passage contained in cap member 57 connects to nipple 61, which serves as an attachment for the pump (not shown).

Alinement of bearing surface 7 with the tape contacting area of drum 3 and heads 9 and 11 may be accomplished by adjusting screw 73 along slot 74 for head 11 and a corresponding screw for head 9, as well as screw 87, which supports ball bearing 71 and shaft 45.

Further modifications of the present invention will be readily apparent from the description of the preferred embodiment herein set forth.

For example, the multi-groove drum 3 will accommodate either a multi-record strip or single record strip. Further, a drum including a single circumferential groove will drive single record strips. When desired, the distributor 35 may be fixed and plate 39 will then serve as a bearing surface for the rotatable drum 3, in which case the grooves 37 need only occupy a semi-peripheral portion of distributor 35. Also, these grooves could be combined to define a single shallow groove to communicate with exhaust port 53.

The subject matter disclosed is not claimed herein. It is disclosed and claimed in my copending application, Serial 527,623, filed August 9, 1955.

Accordingly, it is desired that this invention not be limited to the specific structural arrangements as shown, but by the appended claims wherein:

What is claimed is:

1. In magnetic tape apparatus of the character described, a drum about a portion of the periphery of which an elongated pliable magnetic tape is adapted to be wrapped, said drum having at least one circumferential groove of a width less than that of the tape to be driven, at least one magnetic head disposed adjacent the drum at a position opposite the groove, a post, an arm movably supported on said post, a magnetic head carried by the free end of the arm, resilient means connected between the post and arm for biasing the head in the direction of the drum, and a vacuum distribution system for applying a partial vacuum to progressively changing portions of the drum, thus creating suction along respective changing portions of the groove thereby to drive the tape.

2. Apparatus as in claim 1 wherein an oil film is contained between the post and the arm and wherein said resilient means is adjustable whereby the resilient force may be regulated relative to the retarding force presented by the oil film.

3. In magnetic tape apparatus of the character described, a drum about a portion of the periphery of which an elongated pliable magnetic tape is adapted to be looped, said drum having at least one continuous and uninterrupted open circumferential groove of a width less than that of the tape to be driven, at least one magnetic head disposed adjacent the drum at a position opposite the groove, means for moving the head relative to the drum to bear against the tape and thereby urge it into the groove, means for rotating the drum, and a vacuum distribution system for applying a partial vacuum to a substantial and progressively changing circumferential length of the groove thus creating differential pneumatic pressure acting on the tape to urge it against said periphery and into the groove over a substantial distance adjacent the head and in advance thereof.

4. In magnetic tape apparatus of the character described, a capstan assembly including a member providing a cylindrical exterior surface about which a pliable magnetic tape may be looped, said member having a continuous circumferential recess adapted to be spanned by the tape for a substantial portion of the circumference of said surface, a magnetic head, means for urging the head into contact with the looped part of the tape and with that portion which spans the recess, and means for applying pneumatic suction to said recess over a length of the same extending beyond both sides of the head to cause the adjacent length of the looped tape to be pneumatically urged into said groove and into driving engagement with said peripheral surface.

5. Apparatus as in claim 4 in which said last named means includes valving means serving to apply suction to that length of the recess which is embraced by the looped portion of the tape.

6. Apparatus as in claim 5 in which the valving means includes a stationary part adapted to be connected to a source of suction and a distributor part disposed within said member.

References Cited in the file of this patent

UNITED STATES PATENTS

| | | |
|---|---|---|
| 1,629,154 | Ybarrondo | May 17, 1927 |
| 2,184,229 | Spiers | Dec. 19, 1939 |
| 2,242,548 | Regan | May 20, 1941 |
| 2,313,100 | Stevens | Mar. 9, 1943 |
| 2,348,162 | Warner | May 2, 1944 |
| 2,363,442 | Scott | Nov. 21, 1944 |
| 2,513,423 | Owens | July 4, 1950 |
| 2,518,556 | Kolb | Aug. 15, 1950 |

FOREIGN PATENTS

| | | |
|---|---|---|
| 69,273 | Norway | May 28, 1945 |
| 89,628 | Austria | Jan. 15, 1922 |
| 238,698 | Switzerland | Nov. 16, 1945 |
| 347,501 | Germany | July 26, 1930 |
| 436,743 | Germany | Nov. 6, 1926 |
| 496,626 | Great Britain | Dec. 2, 1938 |
| 677,882 | Germany | July 5, 1939 |